Apr. 3, 1923.
1,450,652
J. STUTIKA
ATTACHMENT FOR INTERNAL COMBUSTION ENGINES
Filed Apr. 13, 1921     2 sheets-sheet 1
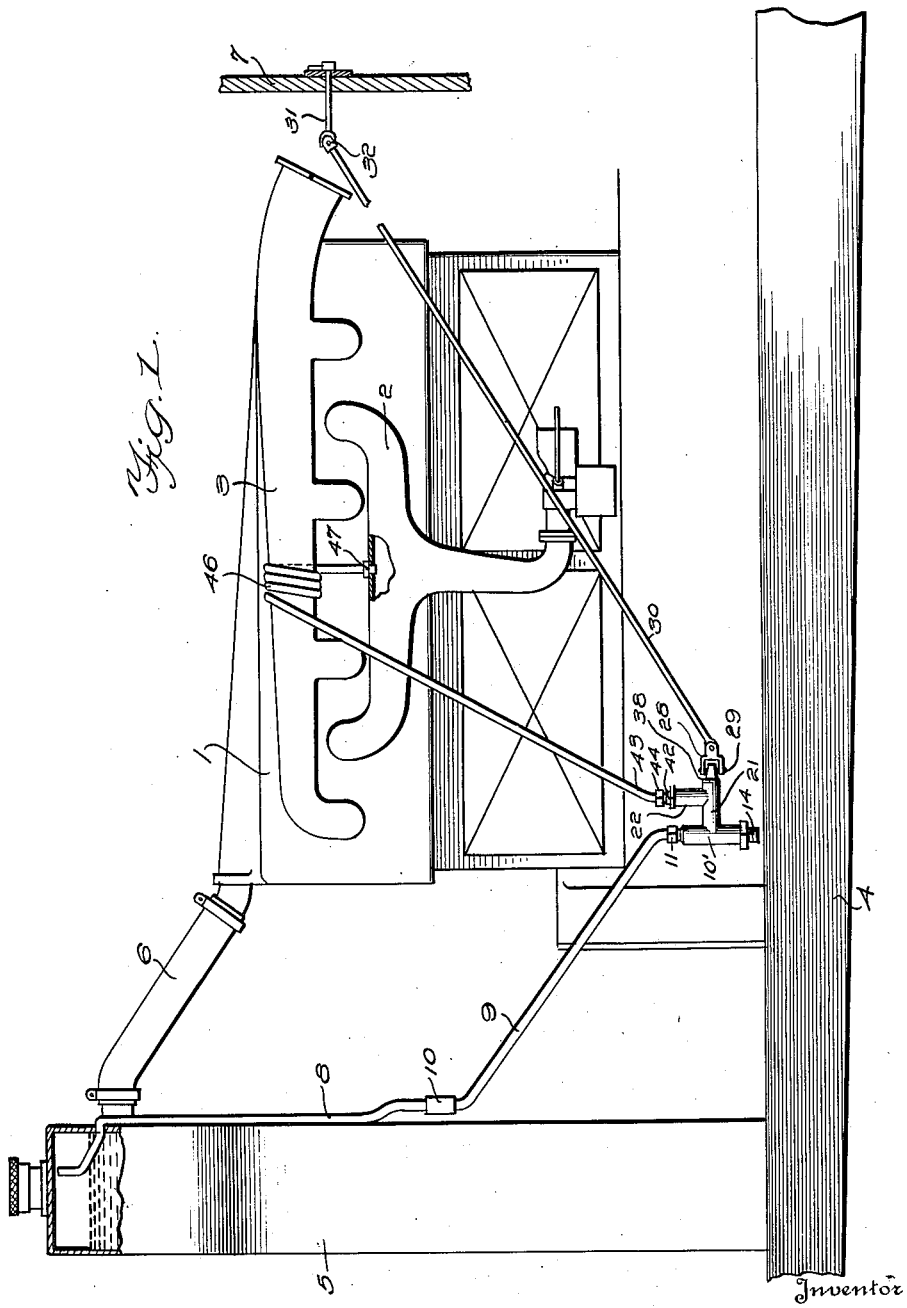

Apr. 3, 1923. 1,450,652
J. STUTIKA
ATTACHMENT FOR INTERNAL COMBUSTION ENGINES
Filed Apr. 13, 1921 2 sheets-sheet 2
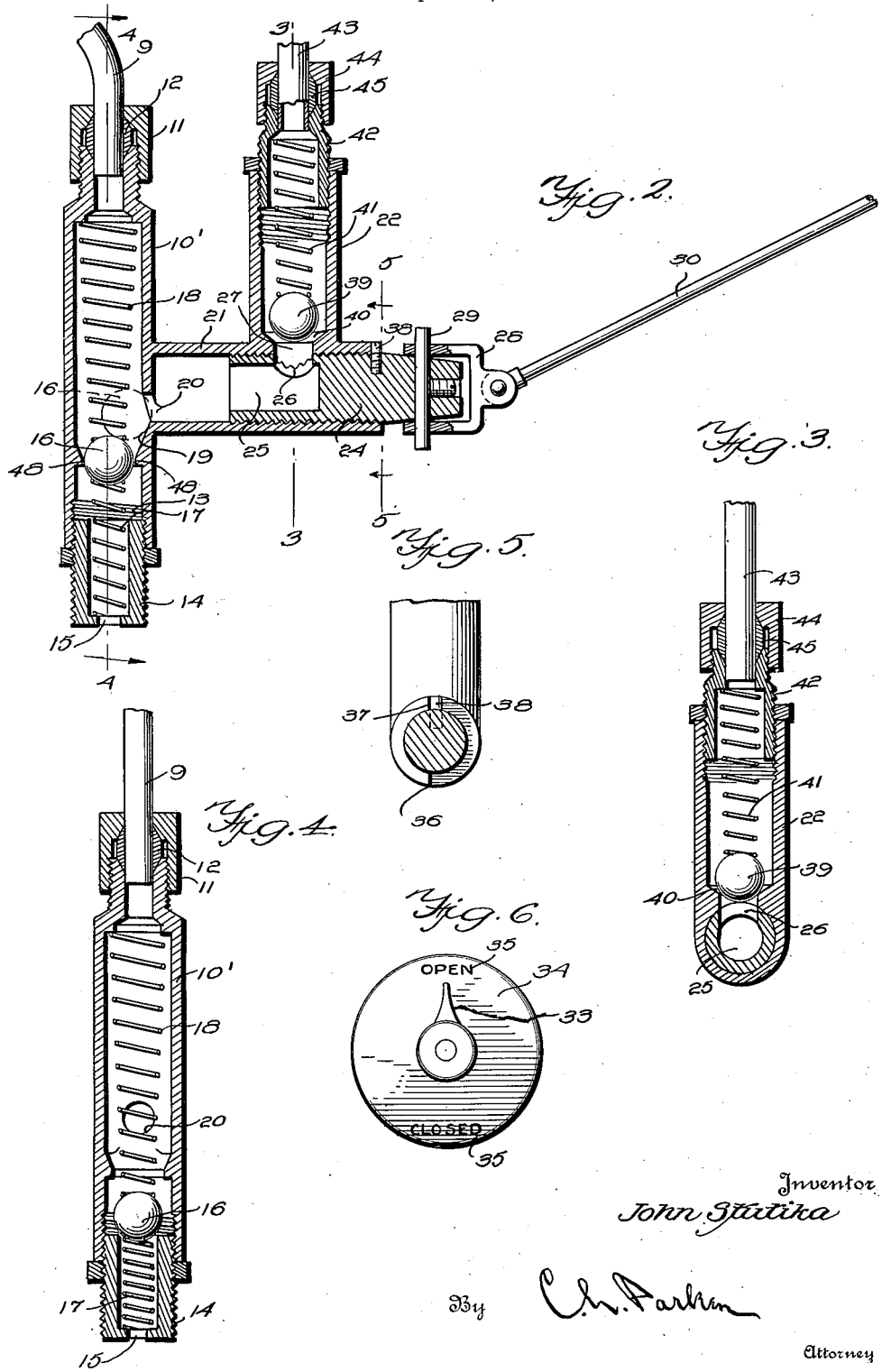

Patented Apr. 3, 1923.

1,450,652

UNITED STATES PATENT OFFICE.

JOHN STUTIKA, OF WEST PULLMAN, ILLINOIS.

ATTACHMENT FOR INTERNAL-COMBUSTION ENGINES.

Application filed April 13, 1921. Serial No. 461,081.

*To all whom it may concern:*

Be it known that I, JOHN STUTIKA, a citizen of the United States, residing at West Pullman, in the county of Cook and State of Illinois, have invented certain new and useful Improvements in Attachments for Internal-Combustion Engines, of which the following is a specification.

This invention relates to attachments for internal combustion engines, and it comprises a connection secured to the overflow pipe of the radiator of the engine, a valve casing secured to one end of said connection, a valve in said casing to control introduction of air, an outlet secured to said casing, manually controlled regulating means in said outlet, a valve casing connected to said outlet, an automatically operating valve arranged therein, and a pipe connected to said casing and to the intake manifold, said pipe being coiled around the exhaust manifold to preheat steam, water, or air passing through it.

In the present invention, I have provided an attachment for internal combustion engines particularly adapted for use on motor vehicles, wherein a water cooling system is employed by means of which steam or water vapor is automatically delivered to the engine cylinders in admixture with air, the mixture being preheated by the heat of the exhaust gases, as it passes to the cylinders. The steam or water vapor is obtained from the overflow pipe of the radiator, a pipe being connected thereto, through which steam or moist air may be delivered.

A valve casing is mounted on the end of this connecting pipe, the valve casing being provided with a valve to control the flow of air and with means for permitting water to be drained therefrom when the engine is standing. The water vapor, steam, and air passing through the valve casing is delivered to a second valve casing which is provided with an automatic valve opened by the suction in the intake manifold to control the flow of the mixture therethrough. A second manually operated control may be provided, operable from the dash of the vehicle, or other suitable point, whereby the attachment may be entirely cut off from the engine or partially cut off, if desired.

By means of the attachment, a supply of air in admixture with steam or water vapor may be delivered to the engine cylinders in a heated condition, thus improving the charge and enabling more efficient results to be obtained from the motor.

In the accompanying drawings, I have shown one embodiment of the invention. In this showing:

Figure 1 is a side elevation of the engine of a motor vehicle showing the attachment applied, Figure 2 is a vertical longitudinal sectional view through the valve casings, Figure 3 is a vertical sectional view on line 3—3 of Figure 2, Figure 4 is a similar view on line 4—4 of Figure 2, Figure 5 is a sectional view on line 5—5 of Figure 2, and, Figure 6 is a detail view of an indicator arranged on the dash of the machine.

Referring to the drawings, the reference numeral 1 designates generally an internal combustion engine which is provided with the usual intake manifold 2, and exhaust manifold 3. The engine is supported on a suitable base 4, and a radiator 5 of any desired type is arranged on the base. The radiator is connected to the water jacket of the engine cylinders, by the pipe 6 at the top, and by a pipe (not shown) at the bottom in the usual manner. A portion of the dash is illustrated at 7. The parts heretofore described are of the usual construction, and form no part of the present invention except in the combination claimed.

The radiator is provided with the usual overflow pipe 8, the upper end of which is arranged near the top of the radiator and this pipe is connected to a connecting pipe 9 by a suitable coupling 10. The end of the pipe 9 communicates with a valve casing 10' being secured therein in any suitable manner, as by means of a packing nut 11 provided with suitable packing 12. The lower end of the valve casing is internally threaded, as at 13, for the reception of a tubular nut 14. The tubular nut is provided with an opening 15. A ball valve 16 is arranged in the valve casing supported by a pair of springs 17 and 18, arranged below and above the valve respectively. The casing is provided with a valve seat 19, having an opening 20 therein, communicating with an outlet pipe 21, arranged at right angles to the valve casing. A second valve casing 22 is arranged on this outlet pipe.

Means are provided for manually controlling communication between the two valve casings. As shown, a plug 24 is arranged within the oulet pipe 21, and this plug is provided with a central bore 25, having an opening 26 arranged therein and adapted to communicate with the outlet opening 27 of the valve casing 22. A yoke 28 is arranged on the end of the plug, being secured thereto by means of a rod or pin 29, and an operating rod 30 is connected to this yoke. The operating rod extends rearwardly and is connected to an operating handle 31 by a swivel connection 32, the operating handle extending through the dash and being provided with a finger or pointer 33, communicating with an indicator 34 having suitable indicia thereon, as at 35, to indicate the position of the valve.

The end of the outlet pipe 21 may be provided with a pair of shoulders 36 and 37, arranged substantially diametrically opposite each other and cooperating with a pin 38, carried by the plug 24 to limit the rotation of the plug.

The valve casing 22 is provided with a ball valve 39 normally retained on a valve seat 40, by means of a spring 41. An adjusting nut 42 may be arranged in the valve casing to permit adjustment of the tension of the spring. A pipe 43 is connected to the upper end of the adjusting nut, the pipe being suitably secured thereto, as by packing nut 44, provided with suitable packing 45. The pipe 43 is coiled around the exhaust manifold, as at 46, to preheat the mixture passing therethrough and is connected to the intake manifold, as at 47.

In operation, the attachment is adapted to furnish a mixture of air and steam or water vapor, varying in accordance with the speed of the engine. When the engine is idle, the valve 16 is maintained at the point indicated in Figure 4 of the drawings, by springs 17 and 18, to permit drainage of water through the overflow pipe 8, the water being discharged through opening 15. The position of the valve may be regulated by tightening or loosening the tubular nut 14. When the engine is running at a normal speed, steam or saturated water vapor is drawn through the pipes 8 and 9, and the valve casing 10' to the valve casing 22. The ball valve 16 then assumes the position shown in Figure 2 of the drawings adjacent the enlargement 48 of the casing to supply a limited amount of air. As the speed of the engine increases, the valve 16 raises to increase the supply of air, until a predetermined speed is reached when the valve is seated on the valve seat 20, as indicated in dotted lines in Figure 2 of the drawings, to cut off the supply of air and steam.

During the operation of the engine, the suction from the intake manifold raises the valve 39 in valve casing 22 in proportion to the speed of the engine to deliver air and vapor to the intake manifold. This valve may be adjusted by means of the adjusting nut 42. When the operator of the engine desires to cut off the attachment, as when the engine is first started, and is cold, or when driving in extremely cold weather, communication between the valve casing 22 and the pipe 21 may be interrupted by turning the operating handle 33 to closed position and moving the opening 26 in plug 24 out of communication with the opening 27, leading into the valve casing. Similarly, if the amount of air and steam or vapor supplied is too great, it may be regulated by partially closing the valve 24.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An attachment for internal combustion engines comprising a pipe connected to the overflow pipe of the radiator, a valve casing connected to said pipe, a valve within said casing, an outlet pipe connected to said valve casing, a second valve casing communicating with said outlet pipe, a manually operated valve arranged in said outlet pipe to control communication with said second valve chamber, an automatically operating valve arranged in said second valve chamber, and a pipe connected thereto, the other end of said pipe being connected to the intake manifold of the engine.

2. An attachment for internal combustion engines comprising a pipe connected to the overflow pipe of the radiator, a valve casing having its upper end connected to said pipe, the lower end of said valve casing being provided with an opening, said valve casing being provided with an outlet opening intermediate its ends, a valve arranged in said casing between said lower opening and said outlet opening and adapted to control passage of air from said lower opening to said outlet opening, a pipe connected to said outlet opening to deliver steam and air to the intake manifold, and an automatically operating valve arranged in said pipe to regulate the supply of steam and air.

3. A device for supplying steam and air to the intake manifold of an internal combustion engine comprising a pipe connected to the overflow pipe of the radiator to supply steam, a valve casing connected to said pipe, said valve casing being provided with an opening for the introduction of air, an outlet opening arranged intermediate said air inlet opening and the connection to said pipe, a valve arranged in said casing and positioned between said openings, a pair of springs arranged above and below said valve to normally cut off the supply of air, said valve being adapted to raise when the engine is running to permit introduction of air, and being further adapted to close said outlet opening to cut off the supply of air and steam when the speed of the engine exceeds a predetermined limit, and connections between said outlet opening and said intake manifold.

In testimony whereof I affix my signature in presence of two witnesses.

JOHN STUTIKA.

Witnesses:
J. H. PETERSON,
E. H. RUMBOLD.